United States Patent
Kubota (10) Patent No.: US 9,612,318 B2
(45) Date of Patent: Apr. 4, 2017

(54) DEVICE AND METHOD OF TRACKING TARGET OBJECT

(71) Applicant: Furuno Electric Company Limited, Nishinomiya, Hyogo-Pref. (JP)

(72) Inventor: Yugo Kubota, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 825 days.

(21) Appl. No.: 14/052,523

(22) Filed: Oct. 11, 2013

(65) Prior Publication Data

US 2014/0104100 A1 Apr. 17, 2014

(30) Foreign Application Priority Data

Oct. 12, 2012 (JP) ................... 2012-227050

(51) Int. Cl.
*G01S 7/22* (2006.01)
*G01S 7/06* (2006.01)
(Continued)

(52) U.S. Cl.
CPC ............... *G01S 7/22* (2013.01); *G01S 7/066* (2013.01); *G01S 13/726* (2013.01); *G01S 13/9307* (2013.01)

(58) Field of Classification Search
CPC .... G01S 13/726; G01S 13/9307; G01S 7/066; G01S 7/22
(Continued)

(56) References Cited

U.S. PATENT DOCUMENTS

| 7,411,519 B1* | 8/2008 | Kuntman | G01C 23/00 340/961 |
| 2002/0008640 A1* | 1/2002 | Horvath | G01S 1/047 340/945 |

FOREIGN PATENT DOCUMENTS

| JP | 63-317790 A | 12/1988 |
| JP | 3-252583 A | 11/1991 |

(Continued)

OTHER PUBLICATIONS

Office Action of the corresponding Japanese Patent Application No. 2012-227050, dated Jun. 7, 2016.
(Continued)

*Primary Examiner* — Timothy A Brainard
(74) *Attorney, Agent, or Firm* — Global IP Counselors, LLP (57) ABSTRACT

A target object tracking device is provided. The device includes a memory for storing association information in which a selecting order of target objects is associated with symbols indicating the target objects, respectively, a starting selection accepting module for accepting a selection of the target objects to start tracking thereof, a symbol reading module for reading the symbols for the selected target objects corresponding to the selecting order of the target objects based on the association information, a tracking module for tracking the selected target objects, a symbol displaying module for displaying the symbols read by the symbol reading module, at positions where the target objects tracked by the tracking module are displayed, and a symbol changing module for changing, according to an operation of a user, the association information and displaying the symbols at the positions where the target objects are displayed, based on the changed association information.

20 Claims, 9 Drawing Sheets

(51) Int. Cl.
*G01S 13/72* (2006.01)
*G01S 13/93* (2006.01)

(58) Field of Classification Search
USPC .......................................................... 342/182
See application file for complete search history.

(56) References Cited

FOREIGN PATENT DOCUMENTS

JP          4-164278  A     6/1992
JP           2501813  B2    5/1996

OTHER PUBLICATIONS

Okamoto, Morihiro, Creating a Management Table of Utility Costs: Observing Transitions for Utility Costs by Creating Line Graph, Nikkei PC Beginners, vol. 3, pp. 54-59, Feb. 18, 2003.

\* cited by examiner

SELECTION OF TARGET OBJECTS

SELECTION OF TARGET OBJECT
AFTER LOST

SYMBOL VARIATIONS

FIG. 8A

| SELECTED ORDER | SYMBOL | | | |
|---|---|---|---|---|
| | SHAPE | SHAPE COLOR | TT NUMBER | SHIP TRACK COLOR |
| 1 | ○ | WHITE | 1 | WHITE |
| 2 | △ | YELLOW | 2 | YELLOW |
| 3 | □ | PURPLE | 3 | PURPLE |
| 4 | ◇ | WHITE | 4 | WHITE |
| 5 | ◇ | WHITE | 5 | GREEN |

DEVICE AND METHOD OF TRACKING TARGET OBJECT

CROSS-REFERENCE TO RELATED APPLICATION(S)

The application claims priority under 35 U.S.C. §119 to Japanese Patent Application No. 2012-227050, which was filed on Oct. 12, 2012, the entire disclosure of which is hereby incorporated by reference.

TECHNICAL FIELD

The present invention generally relates to a target object tracking device provided to radar apparatuses and the like and for tracking a target object.

BACKGROUND OF THE INVENTION

Conventionally, for the purpose of preventing ship collisions and for safety of life, various navigation assisting devices have been developed. For example, radar apparatuses provided with a TT (Target Tracking) function have been known as such navigation assisting devices. Here, to briefly describe, the TT function is for detecting a transition of a position of a target object existing around a ship provided with the TT function, based on a transition of previous radar images.

One mode of using a radar apparatus having a TT function is exemplary described here. A user can select a target object (echo signal) displayed on a radar image to display a mark at the position of the target object. Further, by using the TT function, the user can easily grasp the existing position of the selected target object.

When tracking a multiple number of target objects simultaneously, a multiple number of marks are displayed on a screen. In this case, the user may be unable to distinguish between the target objects and get confused. JP2501813B discloses a target object tracking device that can distinguish between the target objects in such a case.

The target object tracking device of JP2501813B includes the tracking means and a discriminating mark generating means. The tracking means calculates a position and a speed of a target object and outputs them to the discriminating mark generating means along with target object numbers. The discriminating mark generating means stores a relation between the target object number and a discriminating number. The discriminating number is generally a number displayed in vicinity of the target object on display. That is, the discriminating number is a displayed object used to discriminate the target object, and therefore, it corresponds to the mark described above. The user can distinguish to grasp a plurality of target objects by referring to the discriminating numbers.

Note that, JP2501813B also discloses a configuration for changing a color and the like of the displayed mark depending on how dangerous the target object is.

Although JP2501813B discloses the process of storing the relation between the target object number and the discriminating number, it does not disclose the method of establishing and changing (editing) the relation.

Therefore, the user may get confused in a case where the target object to start the tracking thereof is failed is selected again, a new target object number (different from the previous target object number) is assigned to the target object, and a new discriminating number (different from the previous discriminating number) is displayed.

Note that, with general radar apparatuses having the TT function, by selecting a mark and selecting a predetermined setting item, the display mode of the mark can be changed as the user desires. The above problems can be solved by using this function. However, in this method, the display mode of the mark can only be changed one by one, and as the number of the marks increases, it becomes more time consuming.

SUMMARY OF THE INVENTION

The present invention is made in view of the above situation, and generally aims to provide a target object tracking device that associates a mark with a target object as a user desires with a simple operation.

One aspect of the present invention provides a target object tracking device. The device includes a memory, a starting selection accepting module, a symbol reading module, a tracking module, a symbol displaying module, and a symbol changing module. The memory stores association information in which a selecting order of target objects is associated with symbols indicating the target objects, respectively. The starting selection accepting module accepts a selection of the target objects to start tracking thereof. The symbol reading module reads the symbols for the selected target objects corresponding to the selecting order of the target objects based on the association information. The tracking module tracks the selected target objects. The symbol displaying module displays the symbols read by the symbol reading module, at positions where the target objects tracked by the tracking module are displayed. The symbol changing module changes, according to an operation of a user, the association information and displays the symbols at the positions where the target objects are displayed, based on the changed association information.

Thus, by only considering the selecting orders of the target objects, the user can associate each symbol with the target object as he/she desires. Moreover, since the association information can be changed by the symbol changing module, even if the target objects are selected in undesired orders by mistake, it can easily be corrected.

The target object tracking device may also include a takeover selection accepting module for accepting a selection of a first target object that is currently tracked and a second target object that takes over the symbol associated with the first target object. The symbol changing module may change the association information based on the selection accepted by the takeover selection accepting module so that the symbol associated with the first target object is associated with the second target object, and the symbol changing module may display the symbol at the position where the second target object is displayed based on the changed association information.

Thus, even when, for example, an undesired target object to start tracking is selected, the symbol can be associated with a desired target object with a simple operation.

When the second target object is already tracked and a symbol is associated with the second target object, the symbol changing module may switch the symbols associated with the first and second target objects therebetween.

Thus, even when, for example, the user made a mistake in the order of selecting the target object, it can be corrected with a simple operation.

The target object tracking device may also include a takeover selection accepting module for accepting a selection of a third target object of which the tracking is failed and a fourth target object that takes over the symbol associated with the third target object. The symbol changing module may operate such that the fourth target object takes over the symbol associated with the third target object based on the selection accepted by the takeover selection accepting module.

Thus, when tracking of a target object is failed and a symbol associated with the target object is no longer in use, it can be used to display another target object. Therefore, the symbol can be utilized effectively.

At least in a part of the association information stored in the memory, the symbol associated with the target object selected N-th in the selecting order may be the same as the symbol associated with the target object selected M-th in the selecting order.

Thus, the same symbol can be associated with the same kind of target objects, and therefore, a display with which surrounding situation is easily grasped can be achieved.

At least in a part of the association information stored in the memory, shapes of the symbols may be different according to the selecting order of the target object.

Moreover, at least in a part of the association information stored in the memory, strings of letters of the symbols may be different according to the selecting order of the target object.

Moreover, at least in a part of the association information stored in the memory, hue, chroma and brightness of the symbols may be different according to the selecting order of the target object.

Furthermore, at least in a part of the association information stored in the memory, display modes of target object moving tracks serving as the symbols may be different according to the selecting order of the target object.

As described above, the symbols can be distinguished in various modes. Thus, a display with which surrounding situation is easily grasped at a glance can be achieved.

Another aspect of the present invention provides a radar apparatus including the target object tracking device of the above aspect, a radar antenna, a display controller, and a display unit. The radar antenna discharges transmission signals outside and receives reflection signals. The display controller creates a radar image by processing the reflection signals. The display unit displays the symbols of the target objects by overlapping them on the radar image.

Thus, a radar apparatus that can exert the effects described above can be realized.

Another aspect of the present invention provides a target object tracking device including a memory, a starting selection accepting module, a symbol reading module, a tracking module, a symbol displaying module, a symbol changing module. The memory stores association information in which target object numbers applied to target objects that are tracked are associated with symbols indicating the target objects, respectively. The starting selection accepting module accepts a selection of the target objects to start tracking thereof. The symbol reading module applies the target object numbers to the selected target objects and reads the symbols corresponding to the target object numbers based on the association information. The tracking module tracks the selected target objects. The symbol displaying module displays the symbols read by the symbol reading module at positions where the target objects tracked by the tracking module are displayed. The symbol changing module changes, according to an operation of a user, the association information and displays the symbols at the positions where the target objects are displayed, based on the changed association information.

Thus, by only considering the selecting orders of the target objects, the user can associate each symbol with the target object as he/she desires. Moreover, since the association information can be changed by the symbol changing module, even if the target objects are selected in undesired orders by mistake, it can easily be corrected.

Moreover, the target object tracking device may perform the above-described processing of taking over the symbol.

Further another aspect of the present invention provides a method of displaying tracked target objects. The method includes accepting a selection of the target objects to start tracking thereof, reading, based on association information in which an order of selecting target objects is respectively associated with symbols indicating the target objects, the symbols for the selected target objects corresponding to the selecting order of the target objects, tracking the selected target objects, displaying the read symbols at positions where the tracked target objects are displayed, and changing the association information according to an operation of a user and displaying the symbols at the positions where the target objects are displayed, based on the changed association information.

Thus, by only considering the selecting orders of the target objects, the user can associate each symbol with the target object as he/she desires. Moreover, since the association information can be changed by the symbol changing module, even if the target objects are selected in undesired orders by mistake, it can easily be corrected.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Figure 1:
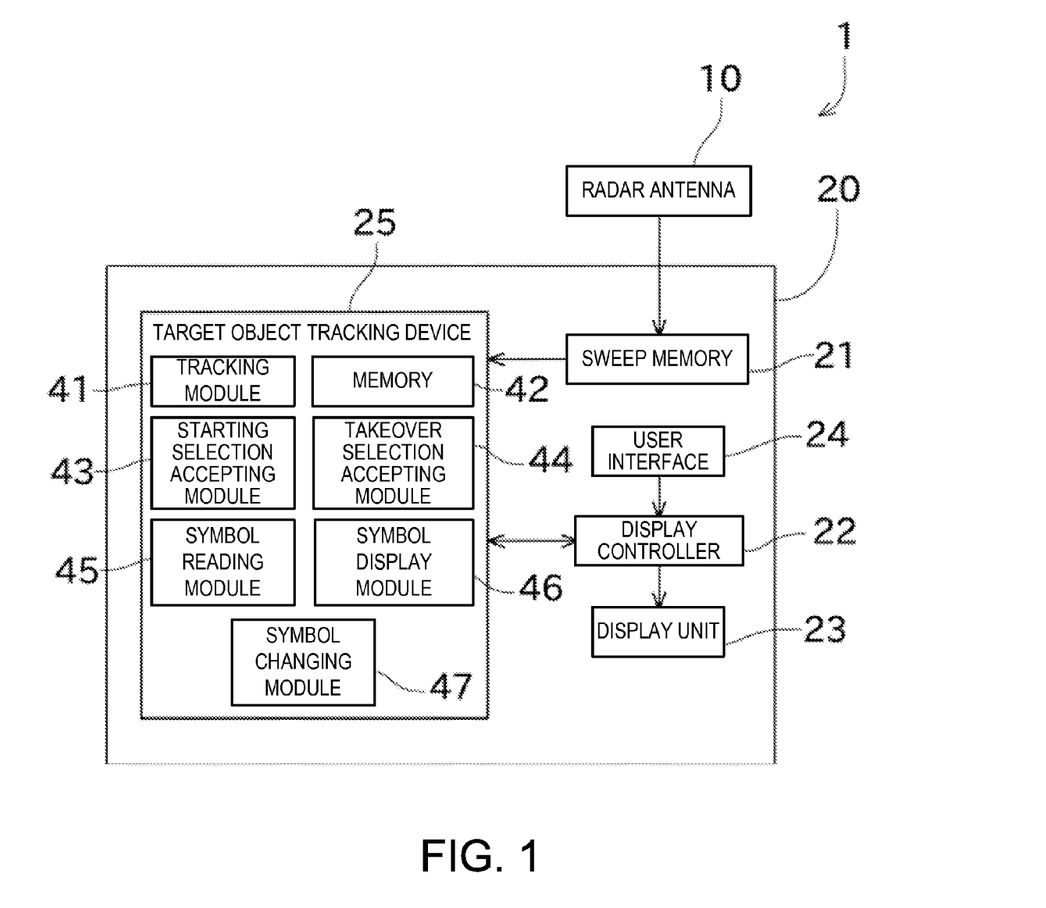
FIG. 1 is a block diagram illustrating a configuration of a radar apparatus according to one embodiment of the present invention.
Figure 2:
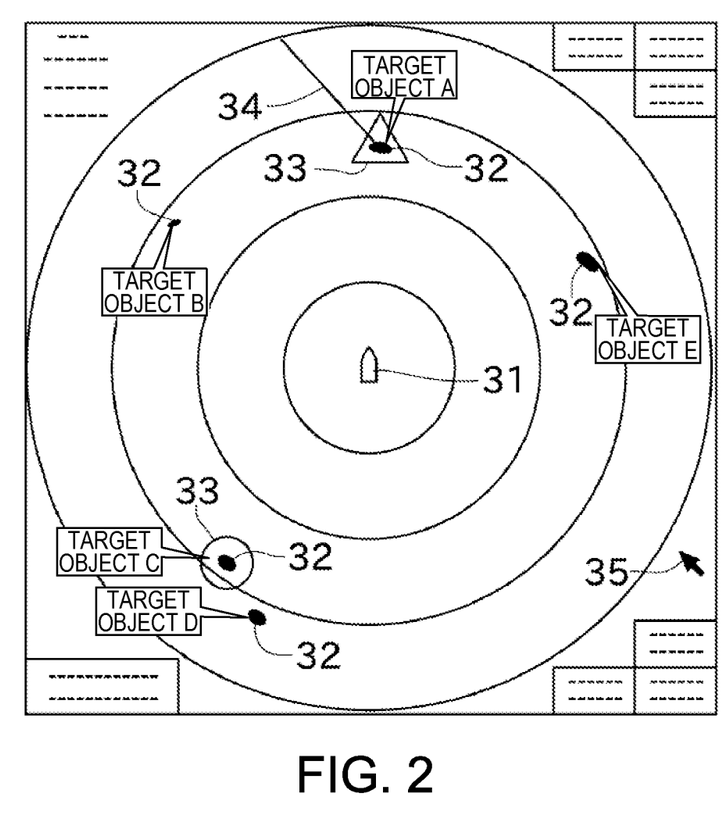
FIG. 2 is a view for describing contents and names of target objects displayed on a screen of a display unit.

Next, one embodiment of the present invention is described with reference to the accompanying drawings. FIG. 1 is a block diagram illustrating a configuration of a radar apparatus 1 in this embodiment. FIG. 2 is a view for describing contents and names of target objects displayed on a screen of a display unit.

The radar apparatus 1 of this embodiment is attached to a ship (hereinafter, may be referred to as "the ship concerned" or may be simply referred to as "the ship") and detects target object(s) around the ship and displays the detection result. The radar apparatus 1 includes a radar antenna 10 and a radar indicator 20.

The radar antenna 10 discharges pulsed radio waves and receives reflection waves of the discharged radio waves. The radar antenna 10 repeats the transception of the radio wave while rotating on a horizontal plane. With this configuration, the scanning can be performed over 360° on the horizontal plane centering on the ship. Note that, instead of such a pulse radar, either one of a CW (Continuous Wave) radar and a pulse Doppler radar may be used.

Each signal (reflection wave) received by the radar antenna 10 is converted into digital data by, for example, an A/D conversion using a reception circuit (not illustrated) and is outputted to the radar indicator 20.

The radar indicator 20 includes a sweep memory 21, a display controller 22, a display unit 23, a user interface 24, and a target object tracking device 25.

The data outputted from the radar antenna 10 is inputted to the sweep memory 21. The sweep memory 21 can store data for one full rotation of the radar antenna 10. The data for one full rotation of the radar antenna 10 is obtained by scanning over 360° on the horizontal plane centering on the ship. In other words, the data showing the state of the target object(s) around the ship (relative position(s) of the target object(s) with respect to the ship) is stored in the sweep memory 21. Note that, since the sweep memory 21 is required to at least store an amount of data for later processing performed by the display controller 22, it may store data for a predetermined angle range of the radar antenna 10 instead of those for the full one rotation.

The display controller 22 mainly includes a CPU for executing various programs and a ROM for storing a program for displaying a radar image and the like on the display unit 23. Specifically, the display controller 22 can create the radar image by reading the data stored in the sweep memory 21 and performing known signal processing.

The display unit 23 is configured by, for example, a liquid crystal display and displays the radar image created by the display controller 22. The radar image is composed of a ship mark 31 indicating the position of the ship, and a target object echo 32 (see FIG. 2). Moreover, the display unit 23 can display, for example, a symbol 33 and a ship track 34 created by the target object tracking device 25 (described later) by overlapping on the radar image.

The user interface 24 is, for example, a key, a mouse, or a trackball provided to the radar indicator 20. The user can control the user interface 24 to perform display setting of the radar image and specify the target object to be tracked. Note that, the display unit 23 and the user interface 24 may be configured as a touch panel.

As illustrated in FIG. 1, the target object tracking device 25 includes a tracking module 41, a memory 42, a starting selection accepting module 43, a takeover selection accepting module 44, a symbol reading module 45, a symbol display module 46, and a symbol changing module 47.

The tracking module 41 is for achieving the TT function. Although the detailed description of the TT (or ARPA) function is omitted since it is a known function, as described above, it is used for detecting a transition of the position of the target object existing around the ship based on the transition of the data stored in the sweep memory 21.

Moreover, the tracking module 41 tracks the target object specified by the user, using the TT function. Thus, the display unit 23 can display the symbol 33 at a position where the echo 32 of the target object selected by the user (hereinafter, may simply be referred to as "the target object echo 32) is displayed. As long as the tracking module 41 keeps tracking the target object, the symbol 33 is displayed conforming to the target object even if the position of the target object changes. Thus, the user can distinguish between target objects. Further, the tracking module 41 obtains the transition of the position of the target object specified by the user and outputs it to the display controller 22. As illustrated in FIG. 2, the transition of the position of the target object is displayed as the linear ship track 34 by overlapping on the radar image. Moreover, the ship track 34 may be a ship track starting when the user specifies the target object and may also include a ship track before the user specifies the target object. Note that, the display mode of the ship track is arbitrary and not limited to a linear shape. For example, the track of the target object displayed on the display unit 23 (image with an afterimage remained) may be displayed.

Figure 3A:
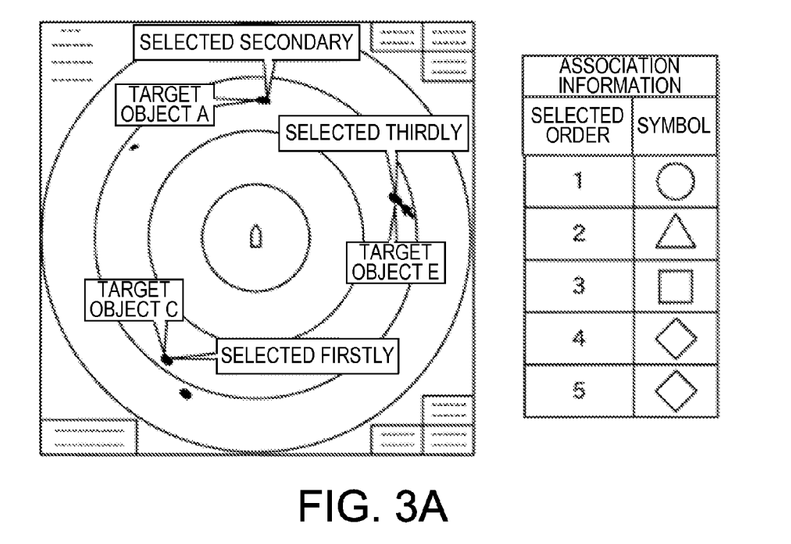
FIGS. 3A and 3B are views illustrating the screen of the display unit when the target objects are selected.
Figure 3B:
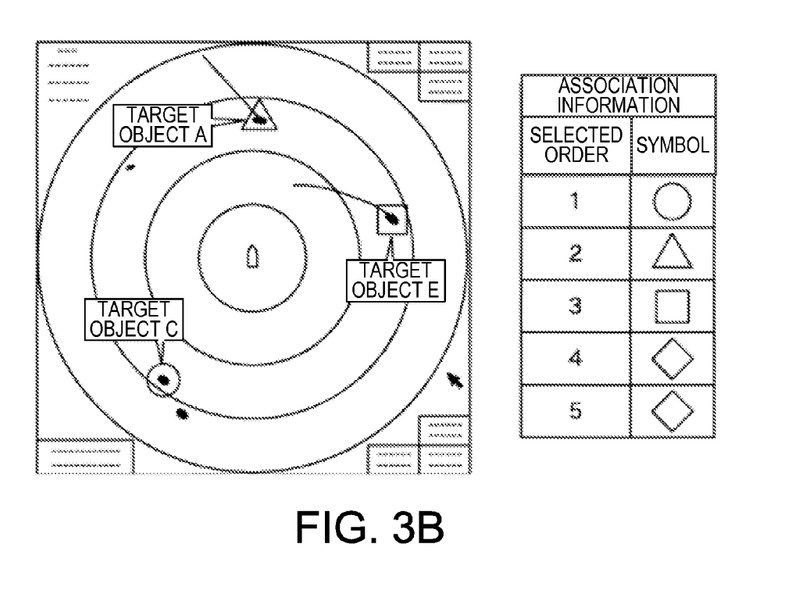

Moreover, in this embodiment, in a case where the user selects a plurality of target objects, the symbols to be displayed are predetermined according to a selecting order of the target objects. FIGS. 3A and 3B are views illustrating the screen of the display unit when the target objects are selected. As illustrated in the table on the right side of FIG. 3A, the memory 42 stores association information in which the selecting order of the target objects is associated with the symbols to be displayed. Although the association information is generally predetermined, it may be changed by an operation of the user. Further, it may be changed when a predetermined condition is satisfied (described later in detail). Moreover, the association information may be stored as the tracking target is selected so that the selection order of the symbols is associated with the selected symbol.

Moreover, in this embodiment, the target objects with the selected order of the fourth and the fifth are associated with the same symbol. For example, by associating the same symbol with the same kind of target objects, the viewing of the image is facilitated.

Note that, the processing performed by the other modules (the starting selection accepting module 43 to the symbol changing module 47) is described later along with the actual processing flow.

Next, the processing performed by the target object tracking device 25 based on the command of the user is described. Note that, in FIG. 2, the names and reference numerals of the target objects are illustrated; however, from FIG. 3A, they may partially be omitted to secure the visibility of the drawings. Moreover, the rectangular balloons illustrated from FIG. 3A are merely for describing the respective drawings, and they are not displayed in practical use. Furthermore, from FIG. 3A, the tables titled as "association information" are illustrated on the right side. These tables are merely supplementary views for facilitating the understanding in viewing the screen of the display unit 23, and they are not displayed on the display unit 23 in practical use.

First, the processing for a case where the user selects target objects to start the tracking thereof and the symbols 33 are displayed on the respective selected target objects is described with reference to FIGS. 2 and 3A and 3B. For example, when the ship starts sailing, the user specifies other ships which sail together with the ship, as the target objects to be tracked.

Specifically, the user controls the user interface 24 to move a pointer 35, and selects target objects displayed on the display unit 23 (specifically, images based on the echoes 32 obtained from the reflection waves of the target objects). Here, as illustrated in FIG. 3A, the target objects are selected in the order of the target object C, the target object A, and the target object E.

The starting selection accepting module 43 of the target object tracking device 25 accepts the selections of the target objects to start the tracking thereof. Then, the symbol reading module 45 of the target object tracking device 25 reads symbols corresponding to the selecting order of the target objects, based on the association information stored in the memory 42. For example, as illustrated in the table on the right side of FIG. 3A, a circular-shaped symbol is read for the target object C which is selected first.

Further, the symbol display module 46 of the target object tracking device 25 performs processing of displaying the symbols read by the symbol reading module 45 on the display unit 23. Thus, as illustrated in FIG. 3B, the symbols corresponding to the selecting order of the target objects are displayed on the corresponding target objects, respectively.

Figure 4A:
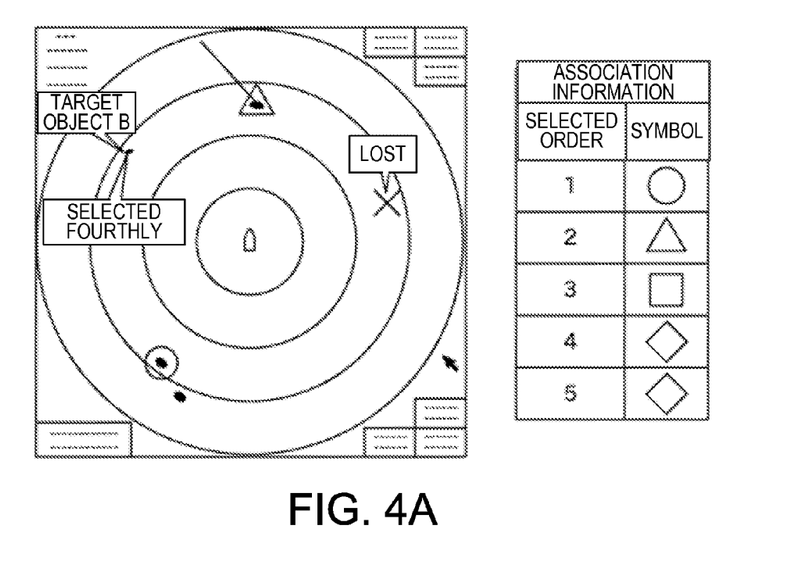
FIGS. 4A and 4B are views illustrating the screen of the display unit when a target object is lost and a new target object is selected.
Figure 4B:
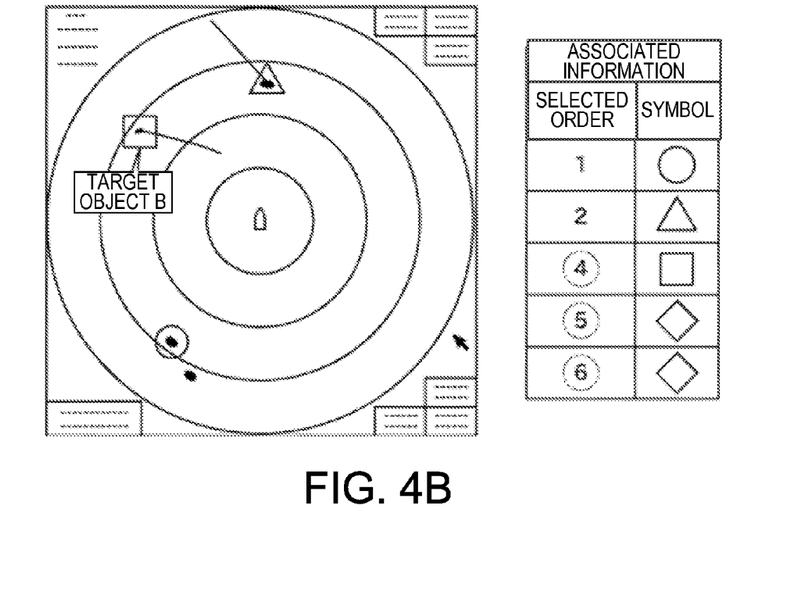

Next, the processing for a case where the tracking of the target object E selected thirdly is failed (the target object E is lost) in the state of FIG. 3B is described with reference to FIGS. 4A and 4B. FIGS. 4A and 4B are views illustrating the screen of the display unit when the target object is lost and a new target object is selected. For example, in this case, the display unit 23 is displayed with a mark indicating the situation at the position where the target object E is lost, so that the user knows that the target object E is lost (see FIG. 4A).

Further, in this state, if the target object B is selected as a tracked target, the target object B will be selected fourthly, and it will be assumed that a diamond-shaped symbol will be selected. However, the target object selected thirdly is currently lost, and the symbol associated with the target object selected thirdly will not be used anymore.

Considering this point, the symbol changing module 47 of the target object tracking device 25 changes the association information. Specifically, as illustrated in FIG. 4B, the symbol associated with the lost target object is changed to be associated with the target object selected fourthly. The symbol changing module 47 further moves down "the numbers of the selecting order of the target objects selected fifthly and thereafter" (see the broken lines in FIG. 4B) to perform changes such that the target objects selected fifthly and thereafter are also suitably associated with the symbols.

Figure 5A:
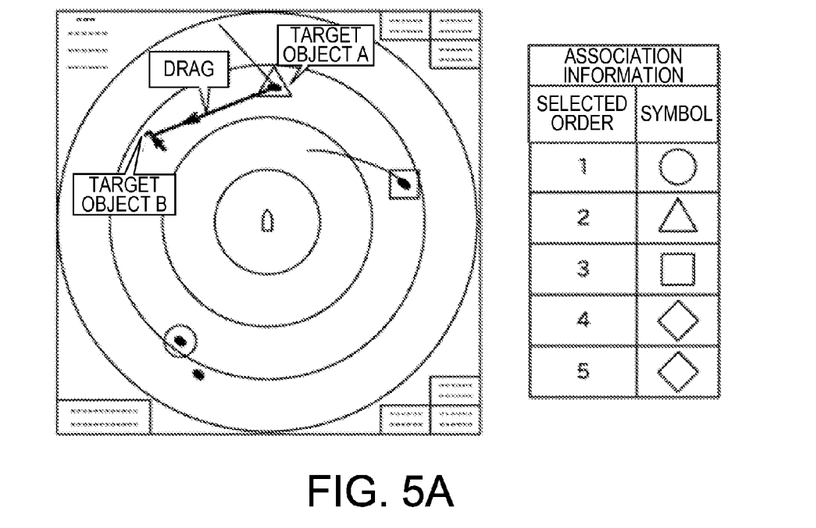
FIGS. 5A and 5B are views illustrating the screen of the display unit when a takeover of a symbol is performed.
Figure 5B:
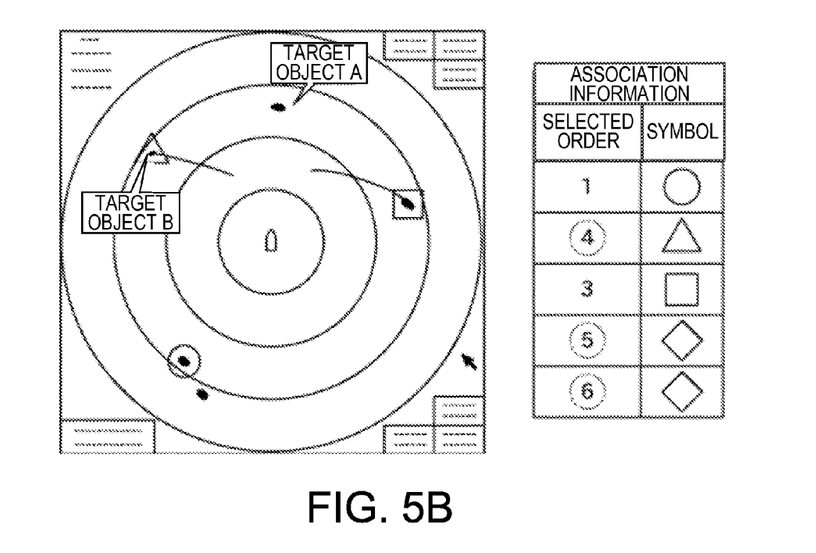

Next, processing for a case of taking over the symbol in the state of FIG. 3B is described with reference to FIGS. 5A and 5B. FIGS. 5A and 5B are views illustrating the screen of the display unit when a takeover of a symbol is performed. Hereinafter, a case is considered where the user originally intends to select the target object B secondary, but he/she selects the target object A secondary by mistake.

In this case, as illustrated in FIG. 5A, the user drags the target object A (the first target object) to the target object B (the second target object). The takeover selection accepting module 44 of the target object tracking device 25 accepts this drag processing (selection of the two target objects). Thus, normally the target object B will be the target object selected fourthly, but since the drag processing (takeover) is performed, the symbol changing module 47 changes the associated information. Specifically, the symbol associated with the target object A which is the start of the drag processing is changed to be associated with the target object B which is the drag destination. As described above, the takeover of the symbol from "the target object associated with a symbol" to "the target object associated with no symbol" can be achieved.

Figure 6A:
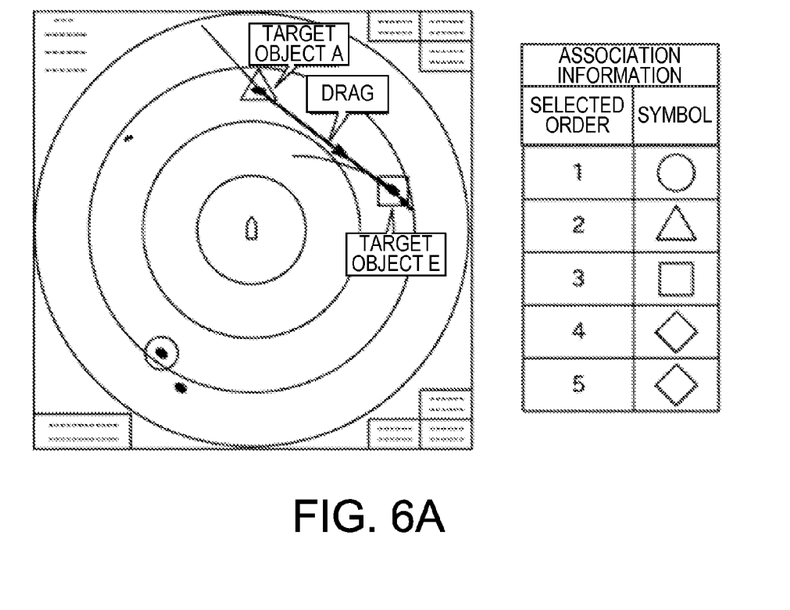
FIGS. 6A and 6B are views illustrating the screen of the display unit when symbols are switched therebetween.
Figure 6B:
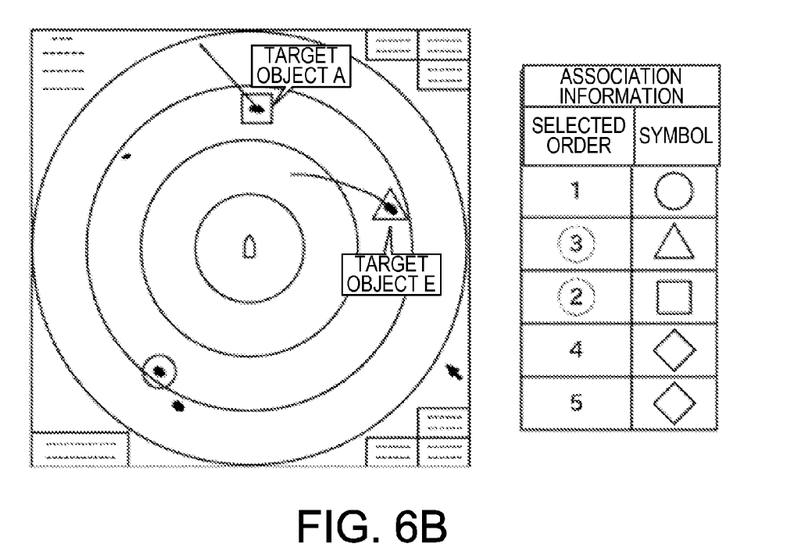

Next, processing for a case of taking over another symbol in the state of FIG. 3B is described with reference to FIGS. 6A and 6B. FIGS. 6A and 6B are views illustrating the screen of the display unit when symbols are switched therebetween. Hereinafter, a case is considered where the user originally intends to select the target object E secondary and the target object A thirdly, but he/she selects in the opposite order by mistake.

In this case, as illustrated in FIG. 6A, the user drags the target object A (the first target object) to the target object E (the second target object). Thus, similarly to the above case, the symbol changing module 47 performs the change such that the symbol associated with the target object A which is the start of the drag processing is switched with the symbol associated with the target object E which is the drag destination. As described above, the takeover of the symbol from "the target object associated with a symbol" to "the target object associated with a symbol" can be achieved.

Figure 7A:
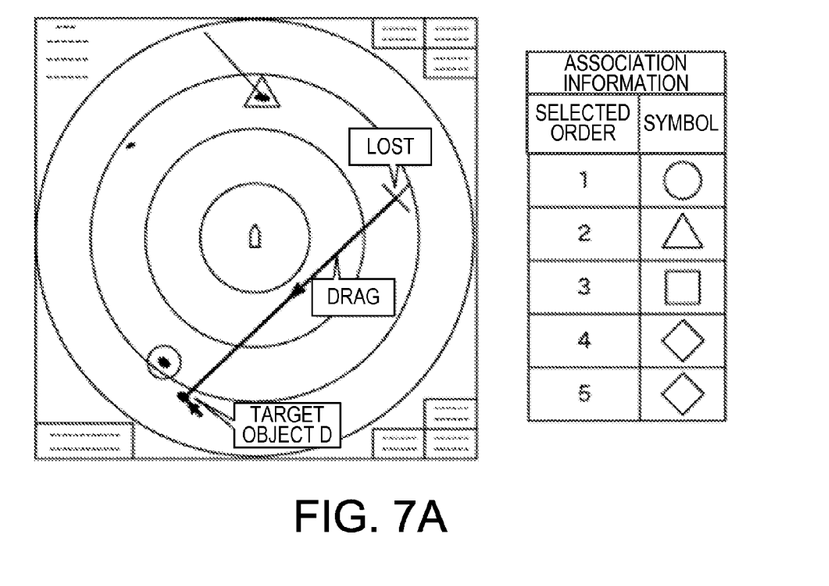
FIGS. 7A and 7B are views illustrating the screen of the display unit when a target object is lost and the takeover of a symbol is performed.
Figure 7B:
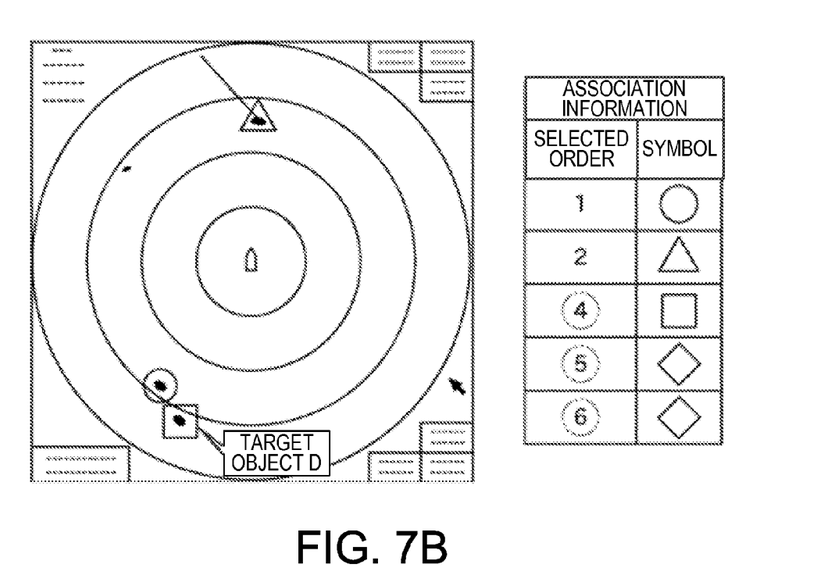

Next, processing for a case where the target object E selected thirdly (the third target object) is lost and the symbol associated with the target object E is associated with a different target object (a target object D in this embodiment, the fourth target object) is described with reference to FIGS. 7A and 7B. FIGS. 7A and 7B are views illustrating the screen of the display unit when a target object is lost and the takeover of a symbol is performed.

In this case, the user drags the mark indicating that the target object is lost, to the target object E. Thus, normally the target object D which is the drag destination will be the target object selected fourthly, but since the drag processing (takeover processing) is performed, the symbol changing module 47 changes the associated information. Specifically, the symbol associated with the mark indicating that the drag destination (target object E) is lost is changed to be associated with the target object D which is the drag destination. As described above, the symbol associated with the lost target object can be taken over by a different target object.

Figure 8A:
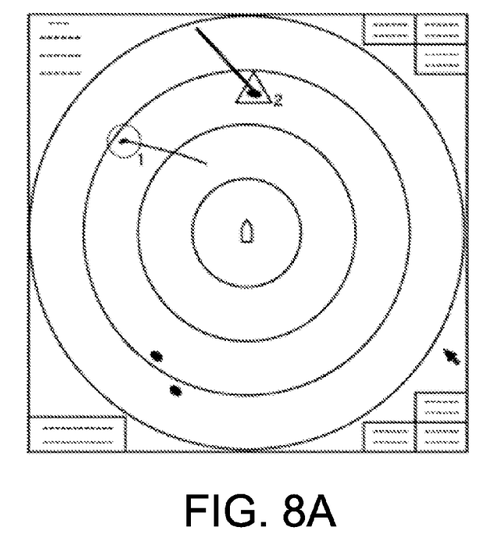
FIGS. 8A and 8B are another example of the symbols.
Figure 8B:
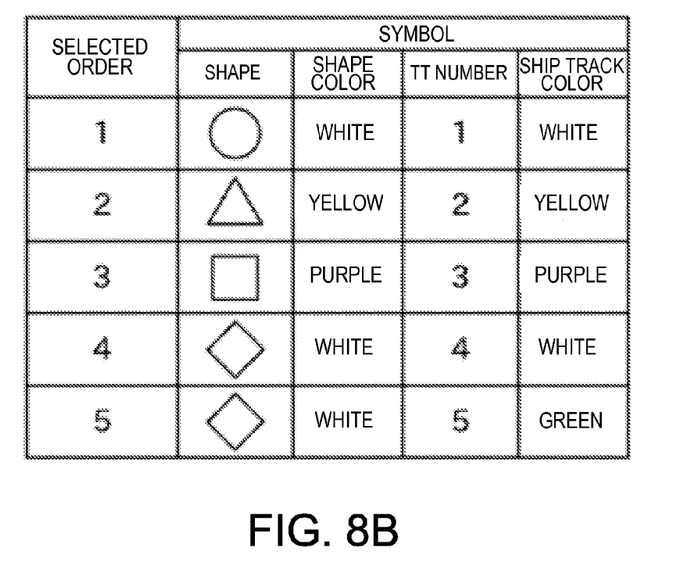

Note that, in the above description, it is configured such that the shape of the symbol is changed according to the selecting order of the target objects; however, the change is not limited to the shape. FIGS. 8A and 8B are another example of the symbols.

For example, as illustrated in FIG. 8B, the color of the symbol and/or the color of the ship track may be changed and, when a TT number is used, it may be changed, according to the selecting order of the target objects. The color of the symbol indicates the color used to draw the symbol. The TT number is a number for discriminating the target objects from each other (target object number). When the TT number is used as a part of the symbol, as illustrated in FIG. 8A, the TT number may be displayed at the bottom-right of the whole symbol. Note that, other than the TT number, an arbitrary letter or an arbitrary string of letters (e.g., alphanumeric characters) for specifying the target object may be used as the symbol. The ship track color indicates the color of the ship track 34. Note that, for the change of the color of the symbol and the color of the ship track, any one of hue, chroma, and brightness may be changed.

As described above, the target object tracking device 25 includes the memory 42, the start selection accepting module 43, the symbol reading module 45, the tracking module 41, the symbol display module 46, and the symbol changing module 47. The memory 42 stores the association information in which the selecting order of the target objects is associated with the symbols indicating the target objects, respectively. The start selection accepting module 43 accepts the selection of the target objects. On the target objects of which the selection is accepted by the start selection accepting module 43, the symbol reading module 45 reads the symbols corresponding to the selecting order of the target objects, based on the association information. The tracking module 41 tracks the target objects of which the selection is accepted by the start selection accepting module 43. The symbol display module 46 displays the symbols read by the symbol reading module 45 at positions where the target objects which are currently tracked by the tracking module 41 are displayed. The symbol changing module 47 changes the association information according to the operation of the user, and displays the symbols at the positions where the target objects are displayed.

Thus, by only considering the selecting order of the target objects, the user can associate each symbol with the target object as he/she desires. Moreover, since the association information can be changed by the symbol changing module, even if the target objects are selected in undesired order by mistake, it can easily be corrected.

Figure 9A:
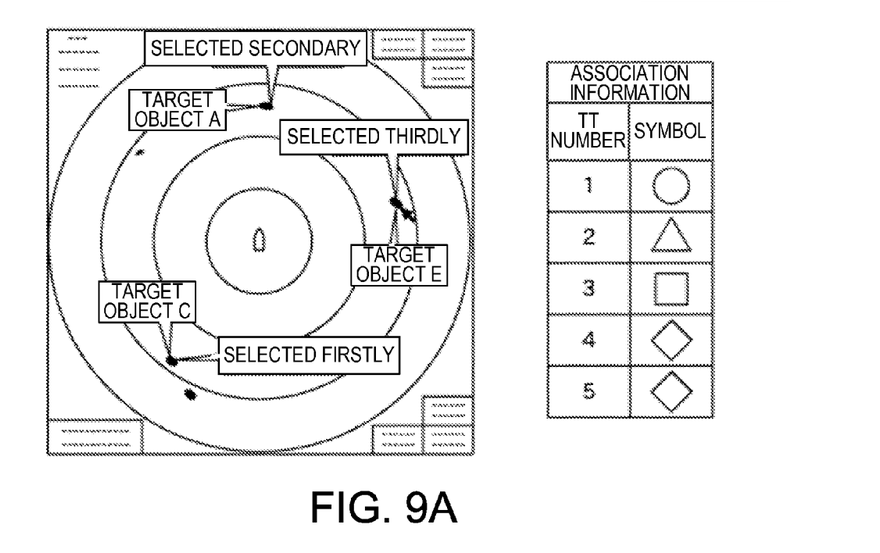
FIGS. 9A and 9B are views illustrating the screen of the display according to a modification.
Figure 9B:
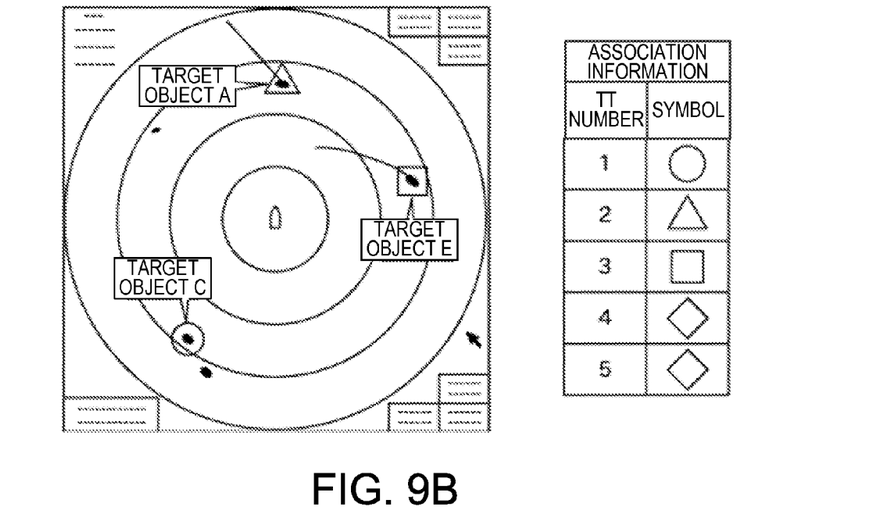

Next, modifications of this embodiment are described with reference to FIGS. 9A and 9B. FIGS. 9A and 9B are views illustrating the screen of the display according to a modification. Note that, in the description of the modifications, the same or similar components with this embodiment are denoted with the same reference numerals in the drawings and the description thereof may be omitted.

In this embodiment, the memory 42 stores the association information between the selecting order of the target object, and the symbols. Whereas, the memory 42 of this modification stores association information between the TT numbers (target object numbers) assigned to the target objects, and the symbols.

Each TT number is assigned by the target object tracking device 25 when, for example, the user selects the target object to start the tracking thereof. The assigning order of the TT numbers is arbitrary, and for example, it may be such that the TT numbers are generally assigned in the selecting order of the target objects. When any of the TT numbers is skipped due to the target object being lost or the like, the skipped TT number is assigned preferentially.

Note that, this embodiment and the modification are only different in the aspect where the items to be associated with the symbols are different. Therefore, by the symbol changing module 47 changing the association information, all the processing described in this embodiment can be performed in the similar procedure.

As above the suitable embodiment of the present invention and the modification thereof are described. However, the above configurations may further be modified as follow.

In the above embodiment, the target object to start the tracking thereof can be selected using the pointer 35 controlled by the mouse or the trackball; however, alternatively, other components such as arrow keys may be used to select. Moreover, the takeover of the symbol is instructed by the drag processing; however, alternatively, the takeover source and destination may be selected in order, and it may be changed suitably.

In the above embodiment, the target object tracking device 25 is provided inside the radar antenna 10; however, it may be provided outside the radar antenna 10.

In this embodiment, the radar apparatus to be installed in the ship is exemplary described; however, the present invention may be applied to radar apparatuses to be installed in another movable body (e.g., aircrafts). Further, the present invention may also be applied to radar apparatuses installed in, for example, a lighthouse, a strait, and a port, which detect the surrounding situation by radar echoes.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radar apparatus comprising:
a target object tracking device, comprising:
 a memory configured to store association information in which a selecting order of target objects is associated with symbols indicating the target objects, respectively;
 a starting selection accepting module configured to accept a selection of the target objects to start tracking thereof;
 a symbol reading module configured to read the symbols for the selected target objects corresponding to the selecting order of the target objects based on the association information;
 a tracking module configured to track the selected target objects;
 a symbol displaying module configured to display the symbols ready for the symbol reading module, at positions where the target objects tracked by the tracking module are displayed; and
 a symbol changing module configured to change, according to an operation of a user, the association information and to display the symbols at the positions where the target objects are displayed, based on the changed association information;
a display controller configured to create a radar image by processing reflection signals received in response to transmission signals transmitted from the radar apparatus; and
a display unit configured to display the symbols of the target objects by overlapping them on the radar image.

2. The radar apparatus of claim 1, wherein
the target object tracking device further comprises a takeover selection accepting module configured to accept a selection of a first target object that is currently tracked and a second target object that takes over the symbol associated with the first target object,
the symbol changing module changes the association information based on the selection accepted by the takeover selection accepting module so that the symbol associated with the first target object is associated with the second target object, and
the symbol changing module displays the symbol at the position where the second target object is displayed based on the changed association information.

3. The radar apparatus of claim 2, wherein
when the second target object is already tracked and a symbol is associated with the second target object, the symbol changing module switches the symbols associated with the first and second target objects therebetween.

4. The radar apparatus of claim 2, wherein
the target object tracking device further comprises the takeover selection accepting module is further configured to accept a selection of a third target object of which the tracking is failed and a fourth target object that takes over the symbol associated with the third target object, and
the symbol changing module operates such that the fourth target object takes over the symbol associated with the third target object based on the selection accepted by the takeover selection accepting module.

5. The radar apparatus of claim 1, wherein at least in a part of the association information stored in the memory, the symbol associated with the target object selected N-th in the selecting order is the same as the symbol associated with the target object selected M-th in the selecting order.

6. The radar apparatus of claim 1, where at least in a part of the association information stored in the memory, shapes of the symbols are different according to the selecting order of the target object.

7. The radar apparatus of claim 1, where at least in a part of the association information stored in the memory, strings of letters of the symbols are different according to the selecting order of the target object.

8. The radar apparatus of claim 1, where at least in a part of the association information stored in the memory, hue, chroma and brightness of the symbols are different according to the selecting order of the target object.

9. The radar apparatus of claim 1, where at least in a part of the association information stored in the memory, display modes of target object tracks serving as the symbols are different according to the selecting order of the target object.

10. The radar apparatus of claim 1, further comprising:
a radar antenna configured to discharge the transmission signals to outside of the radar apparatus and receive the reflection signals.

11. A radar apparatus comprising:
a target object tracking device, comprising:
a memory configured to store association information in which target object numbers applied to target objects that are tracked are associated with symbols indicating the target objects, respectively;
a starting selection accepting module configured to accept a selection of the target objects to start tracking thereof;
a symbol reading module configured to apply the target object numbers to the selected target objects and read the symbols corresponding to the target object numbers based on the association information;
a tracking module configured to track the selected target objects;
a symbol displaying module configured to display the symbols read by the symbol reading module at positions where the target objects tracked by the tracking module are displayed; and
a symbol changing module configured to change, according to an operation of a user, the association information and display the symbols at the positions where the target objects are displayed, based on the changed association information;
a display controller configured to create a radar image by processing reflection signals received in response to transmission signals transmitted from the radar apparatus; and
a display unit configured to display the symbols of the target objects by overlapping them on the radar image.

12. The radar apparatus of claim 11, wherein
the target object tracking device further comprises a takeover selection accepting module configured to accept a selection of a first target object that is currently tracked and a second target object that takes over the symbol associated with the first target object,
the symbol changing module changes the association information based on the selection accepted by the takeover selection accepting module so that the symbol associated with the first target object is associated with the second target object, and
the symbol changing module displays the symbol at the position where the second target object is displayed based on the changed association information.

13. The radar apparatus of claim 12, wherein when the second target object is already tracked and a symbol is associated with the second target object, the symbol changing module switches the symbols associated with the first and second target objects therebetween.

14. The radar apparatus of claim 12, wherein
the target object tracking device further comprises the takeover selection accepting module is further configured to accept a selection of a third target object of which the tracking is failed and a fourth target object that takes over the symbol associated with the third target object, and
the symbol changing module operates such that the fourth target object takes over the symbol associated with the third target object based on the selection accepted by the takeover selection accepting module.

15. A method for controlling a radar apparatus to display tracked target objects, comprising:
creating, by a processor of the radar apparatus, a radar image on a display by processing reflection signals received in response to transmission signals transmitted from the radar apparatus;
accepting by the radar apparatus a selection of the target objects to start tracking thereof;
reading, by the processor based on association information in which an order of selecting target objects is respectively associated with symbols indicating the target objects, the symbols for the selected target objects corresponding to the selecting order of the target objects;
tracking, by the processor, the selected target objects;
displaying on the display, as controlled by the processor, the read symbols at positions where the tracked target objects are displayed by overlapping the read symbols on the radar image; and
changing, as controlled by the processor, the association information according to an operation of a user and displaying the symbols at the positions where the target objects are displayed, based on the changed association information.

16. The method of claim 15, further comprising
accepting by the radar apparatus a selection of a first target object that is currently tracked and a second target object that takes over the symbol associated with the first target object,
changing, by the processor, the association information based on the selection accepted by the takeover selection so that the symbol associated with the first target object is associated with the second target object, and
displaying on the display, as controlled by the processor, the symbol at the position where the second target object is displayed based on the changed association information.

17. The method of claim 16, wherein
when the second target object is already tracked and a symbol is associated with the second target object, the changing switches the symbols associated with the first and second target objects therebetween.

18. The method radar apparatus of claim 16, further comprising
accepting by the radar apparatus a selection of a third target object of which the tracking is failed and a fourth target object that takes over the symbol associated with the third target object, and
changing, by the processor, the fourth target object takes over the symbol associated with the third target object based on the selection accepted.

19. The method of claim 15, further comprising:
controlling, by the processor, a radar antenna to discharge the transmission signals to outside of the radar apparatus and receive the reflection signals.

20. The radar apparatus of claim 11, further comprising:
a radar antenna configured to discharge the transmission signals to outside of the radar apparatus and receive the reflection signals.

\* \* \* \* \*